(12) United States Patent
Bossy et al.

(10) Patent No.: US 12,453,457 B2
(45) Date of Patent: Oct. 28, 2025

(54) IMAGING METHOD, ENDOSCOPE AND COMPUTER PROGRAM PRODUCT

(71) Applicants: UNIVERSITE GRENOBLE ALPES, Saint Martin d'Hères (FR); CENTRE NATIONAL DE LA RECHERCHE SCIENTIFIQUE, Paris (FR)

(72) Inventors: Emmanuel Bossy, Saint Martin d'Hères (FR); Antonio Miguel Caravaca Aguirre, Saint Martin d'Hères (FR)

(73) Assignees: UNIVERSIT GRENOBLE ALPES, Saint Martin d'Hères (FR); CENTRE NATIONAL DE LA RECHERCHE SCIENTFIQUE, Paris (FR)

( * ) Notice: Subject to any disclaimer, the term of this patent is extended or adjusted under 35 U.S.C. 154(b) by 36 days.

(21) Appl. No.: 18/570,000

(22) PCT Filed: Jun. 20, 2022

(86) PCT No.: PCT/IB2022/055698
§ 371 (c)(1),
(2) Date: Dec. 13, 2023

(87) PCT Pub. No.: WO2023/275664
PCT Pub. Date: Jan. 5, 2023

(65) Prior Publication Data
US 2024/0277208 A1    Aug. 22, 2024

(30) Foreign Application Priority Data
Jul. 1, 2021  (FR) ..................................... 2107170

(51) Int. Cl.
*A61B 1/00*    (2006.01)
*A61B 1/04*    (2006.01)
(Continued)

(52) U.S. Cl.
CPC .......... *A61B 1/00009* (2013.01); *A61B 1/043* (2013.01); *A61B 1/07* (2013.01);
(Continued)

(58) Field of Classification Search
CPC ....... A61B 1/00009; A61B 1/043; A61B 1/07; A61B 5/0035; A61B 5/0095; A61B 5/7246; A61B 5/7267; A61B 1/00165
See application file for complete search history.

(56) References Cited

U.S. PATENT DOCUMENTS 5,956,447 A    9/1999  Zel'Dovich et al.
6,894,828 B2   5/2005  Pelouch et al.
(Continued)

OTHER PUBLICATIONS

Matthias [Comparison of round- and square-core fibers for sensing, imaging, and spectroscopy, vol. 29, No. 5 / Mar. 1, 2021 / Optics Express 6523]. (Year: 2021).*
(Continued)

*Primary Examiner* — Oommen Jacob
(74) *Attorney, Agent, or Firm* — Seckel IP, PLLC (57) ABSTRACT

The method for imaging an object to be imaged includes: generating, using a lighting device (2), a series of illumination patterns; for each illumination pattern, carrying out a stimulating phase in which translations of the illumination pattern are carried out over an entrance of a square-core multimode optical fiber (4) by means of at least one translating device (3*a*) of an optical system (3) placed between the lighting device (2) and the entrance of the square-core multimode optical fiber (4), the translations being carried out in a plane parallel to the entrance plane of the square-core multimode optical fiber (4); for each stimulating phase, carrying out an acquiring phase in which the signal generated by the illumination pattern on the object to be imaged (O) placed at the exit of the square-core multimode optical fiber (4) is measured by a signal-measuring device (5; 9);
(Continued)

and reconstructing, using a computing device (6), by the signal measured in each acquiring phase, the object to be imaged.

21 Claims, 2 Drawing Sheets

(51) Int. Cl.
*A61B 1/07* (2006.01)
*A61B 5/00* (2006.01)

(52) U.S. Cl.
CPC .......... *A61B 5/0035* (2013.01); *A61B 5/0095* (2013.01); *A61B 5/7246* (2013.01); *A61B 5/7267* (2013.01)

(56) References Cited

U.S. PATENT DOCUMENTS

| | | | |
|---|---|---|---|
| 9,661,986 | B2 | 5/2017 | Shahmoon et al. |
| 10,254,534 | B2 | 4/2019 | Carvaca-Aguirre et al. |
| 10,398,294 | B2 | 9/2019 | Shahmoon et al. |
| 10,809,750 | B2 * | 10/2020 | Swanson .................. A61B 1/07 |
| 2004/0008405 | A1 | 1/2004 | Pelouch et al. |
| 2011/0282192 | A1 * | 11/2011 | Axelrod ............... A61B 5/0066 |
| | | | 600/427 |
| 2014/0104681 | A1 * | 4/2014 | Berman ............. G02B 21/0032 |
| | | | 359/385 |
| 2015/0015879 | A1 | 1/2015 | Papdopoulos et al. |
| 2015/0377701 | A1 | 12/2015 | Pawluczyk et al. |
| 2016/0022119 | A1 | 1/2016 | Shahmoon et al. |
| 2017/0100024 | A1 | 4/2017 | Shahmoon et al. |
| 2017/0153440 | A1 * | 6/2017 | Caravaca-Aguirre ....................... |
| | | | G02B 23/2469 |
| 2019/0212761 | A1 | 7/2019 | Swanson et al. |
| 2019/0369650 | A1 * | 12/2019 | Swanson .................. G02B 6/04 |
| 2020/0015669 | A1 | 1/2020 | Shahmoon et al. |
| 2021/0055752 | A1 | 2/2021 | Swanson et al. |
| 2024/0277208 | A1 * | 8/2024 | Bossy .................. A61B 5/7246 |

OTHER PUBLICATIONS

International Search Report and Written Opinion dated Oct. 17, 2022 in corresponding application No. PCT/IB2022/055698; with English partial translation and partial machine translation (total 17 pages).

Godefroy et al., "Compensating for visibility artefacts in photoacoustic imaging with a deep learning approach providing prediction uncertainties", Photoacoustics, vol. 21, No. 100218, 2021, pp. 1-8.

Bertolotti et al., "Non-invasive imaging through opaque scattering layers", Nature, vol. 491, Nov. 8, 2012, pp. 232-234; suppl. pp. 1-4 (total 7 pages).

Kingma et al., "Adam: A Method for Stochastic Optimization", conference paper, 3rd International Conference on Learning Representations, San Diego, CA, 2015, pp. 1-15.

* cited by examiner

IMAGING METHOD, ENDOSCOPE AND COMPUTER PROGRAM PRODUCT

The present invention relates to the technical field of imaging, and more particularly relates to an imaging method and to an endoscope implementing the imaging method.

Currently, most endoscopes use a bundle of single-mode fibers to form an image of an object to be imaged placed at the exit of the fiber bundle: the fiber bundle is lit fiber by fiber by scanning the fiber bundle regularly, then the light received from the object to be imaged is collected for each fiber to deduce an image of the object to be imaged pixel by pixel.

The imaging results obtained with these existing endoscopes are good. However, these prior-art endoscopes have drawbacks.

Essentially, the bundle of single-mode fibers has a large diameter, this making prior-art endoscopes difficult to use in procedures where the imaging probe of the endoscope, which probe consists of the bundle of single-mode fibers, must be minimally invasive.

In the present application, in accordance with common usage, a multimode optical fiber is defined as being a fiber with a single large-diameter core that allows a plurality of modes to propagate, as opposed to a single-mode optical fiber, which has a single core through which a single mode is able to propagate. It will be noted that a multimode optical fiber is not the same as a multicore optical fiber, which comprises a plurality of cores, each core generally being single-mode.

Optical imaging through multimode optical fibers is a field of research that has been developing over the last ten years. In particular, endoscopic optical imaging through multimode optical fibers makes it possible to produce endoscopic imaging systems of dimensions that are very small with respect to the conventional approach based on bundles of single-mode optical fibers. Generally, standard multimode optical fibers (of round core) without any optical component at the sample end (so-called "lensless endoscope") are used and prior calibration is necessary to produce an image, because a multimode optical fiber is a complex propagation medium. United States patent application US2015/0015879A1 and U.S. Pat. Nos. 5,956,447 and 10,254,534B2 disclose examples of such multimode-fiber endoscopes. These endoscopes may be used in procedures where the imaging probe of the endoscope is minimally invasive.

U.S. Pat. Nos. 10,809,750B2 and 10,398,294B2 also describe endoscopes according to the prior art.

However, in multimode fibers, because a single medium is used to propagate a plurality of modes, the information becomes mixed/scrambled during propagation and this scrambling can only be compensated for by prior calibration, making such multimode-fiber endoscopes time-consuming to employ and not very user-friendly.

Furthermore, the calibration depends on the shape of the multimode optical fiber. If the shape of the multimode optical fiber changes after calibration, the calibration must be repeated, even if the changes in shape are very small. To overcome the effects of changes to the shape of multimode optical fibers, rigid multimode optical fibers are therefore used, this greatly limiting the fields of application and the practical uses of the endoscope.

The ability to image through flexible fibers has been demonstrated only with one particular type of optical fibers, called multi-core fibers, for which the calibrating phase remains approximately valid even after a change in fiber shape.

However, these fibers are similar in principle to bundles of single-mode fibers, and therefore have the same drawback in terms of size, namely they have a cross section typically 20 to 30 times larger than the cross section of the multimode optical fibers of the invention.

There is therefore a need for a minimally invasive endoscope that does not require a prior calibrating step and that will allow a flexible optical fiber to be used regardless of its configuration (straight or bent), so as to make the endoscope more comfortable to employ, the invention meeting this need through use of a square-core multimode optical fiber. In the present application, in accordance with common usage, a square-core multimode optical fiber is defined to be a multimode optical fiber the core of which is square in cross section.

In these square-core multimode optical fibers there is a translational memory effect that allows the calibrating phase to be avoided. Specifically, it has been demonstrated that a memory effect present in the case of scattering media makes it possible to image an object for imaging without prior calibration of the scattering medium. It will be noted that this assumes a memory effect in every direction. In round-core multimode optical fibers, a rotational (and therefore unidirectional) memory effect has been described, but is insufficient to produce an image.

The method according to the invention for forming an image of the object to be imaged is based on two steps, 1) a measuring step, and 2) a step of reconstructing the object. It is powerful because no calibration steps are required, and because it remains applicable even when the fiber is bent.

The inventors have demonstrated that the optical field at the exit of the square-core multimode optical fiber may be decomposed into the sum of four optical fields, all of which translate when the entrance illumination pattern is translated. This "quadruple memory effect" is a generalization of the memory effect well known in the art, which corresponds to translation of a single exit field when the entrance field translates.

The core of the invention is based on the existence of the "quadruple" memory effect in square-core multimode optical fibers, and its use in object reconstruction without calibration. In addition, this effect has been observed even when the square-core multimode optical fiber is bent, this making the method of the invention applicable to flexible fibers (provided that the fiber does not move during the measurement).

One subject of the present invention is therefore a method for imaging an object to be imaged, characterized in that it comprises:

generating, using a lighting device, a series of illumination patterns;

for each illumination pattern, carrying out a stimulating phase in which translations of the illumination pattern are carried out over an entrance of a square-core multimode optical fiber by means of at least one translating device of an optical system placed between the lighting device and the entrance of the square-core multimode optical fiber, the translations being carried out in a plane parallel to the entrance plane of the square-core multimode optical fiber;

for each stimulating phase, carrying out an acquiring phase in which the signal generated by the illumination pattern on the object to be imaged placed at the exit of the square-core multimode optical fiber is measured by a signal-measuring device; and reconstructing, using a computing device, by means of the signal measured in each acquiring phase, the object to be imaged.

The invention is based on use of square-core multimode optical fibers. Unlike the fibers conventionally used, which have a round core, the inventors have demonstrated theoretically and experimentally that in these square-core multimode optical fibers there exists a property of translational invariance (called the "translational memory effect" in the literature: the pattern at the exit of the medium (here the square-core multimode optical fiber) translates when the illumination pattern is translated), which effect does not exist in round-core multimode optical fibers. Exploitation of this memory effect in square-core multimode optical fibers makes it possible to avoid the calibrating phase (in its entirety or in part), and in particular makes it possible to form images through flexible fibers (the shape of which may change during use), two limitations of current methods based on standard round-core fibers, which require a calibration and which only work when the shape of the fiber does not change. Square-core multimode optical fibers are an existing commercial product, used for the purpose of controlling the shape of an illumination pattern. The invention relates to a completely new use of these fibers in endoscopic optical imaging. The square-core multimode optical fiber allows the diameter of the fiber to be greatly decreased with respect to current endoscopes based on bundles of single-mode fibers, allowing a cross section to be achieved for the square-core multimode optical fiber that is typically 20 to 30 times smaller than the cross section of the bundles of single-mode fibers of the prior art, and therefore contributes to decreasing the intrusiveness of the endoscope with a view to obtaining a miniature device.

No optics are present at the exit end of the square-core multimode optical fiber, between the exit of the square-core multimode optical fiber and the object to be imaged, this making the structure at the exit end of the fiber extremely simple and robust.

The number of illumination patterns in the series must be higher than or equal to one. However, the higher the number of illumination patterns in the series, the better the reconstruction of the object to be imaged.

The illumination pattern is preferably a speckle pattern, but may also be a focused spot without departing from the scope of the present invention.

The optical system may include one or more optical components such as lenses, mirrors, gratings, prisms, diffusers, diaphragms, retarders, polarizers, filters, beam splitters, beam expanders, concentrators, digital micromirror devices, etc.

According to one embodiment, the at least one translating device is one among a liquid-crystal-based spatial light modulator, a digital-micromirror-device spatial light modulator, an optical diffuser associated with a translation stage, and an optical diffuser associated with galvanometric mirrors. The optical diffusers may in particular be made of a diffusing glass.

According to one embodiment, the signal-measuring device is an optical sensor for measuring the optical signal reflected by the object to be imaged, associated with a detection optical fiber placed between the object to be imaged and the optical sensor, the detection optical fiber being one among the square-core multimode optical fiber and an auxiliary optical fiber. A beam splitter is present in the optical system to transfer the optical signal generated by the illumination pattern on the object to be imaged through the square-core multimode optical fiber to the optical sensor.

According to one embodiment, the signal-measuring device is a hydrophone that comprises an optical fiber and that measures the photoacoustic signal of the object to be imaged. The optical fiber of the hydrophone is then linked to a photoacoustic detecting device via its end opposite the one facing the object to be imaged.

According to one embodiment, the object to be imaged is fluorescent and the signal-measuring device is an optical sensor for measuring the fluorescence signal emitted by the object to be imaged, associated with a detection optical fiber placed between the object to be imaged and the optical sensor, the detection optical fiber being one among the square-core multimode optical fiber and an auxiliary optical fiber. A dichroic filter is then present in the optical system to filter the optical signal generated by the illumination pattern on the object to be imaged in the square-core multimode optical fiber or the auxiliary optical fiber, which filtered signal is then sent by the optical system to the optical sensor.

According to one embodiment, in each stimulating phase, the translations are carried out in all or part of the entrance plane of the square-core multimode optical fiber.

According to one embodiment, the lighting device is a coherent light source. Specifically, the lighting device must lead to a speckle pattern at the exit of the square-core multimode optical fiber. The lighting device will preferably be monochromatic, and more preferably a laser.

According to one embodiment, the computing device is selected from at least one among a computer, a microprocessor, a digital signal processor (DSP), a processor, a microcontroller, a field-programmable gate array (FPGA), and an application-specific integrated circuit (ASIC), and comprises memory.

According to one embodiment, reconstruction of the object to be imaged by the computing device comprises a first step comprising, in each acquiring phase, computing the spatial autocorrelation of the measured signal then computing the average autocorrelation of all the illumination patterns, and a second step of deducing the object to be imaged from the average autocorrelation of all the illumination patterns obtained in the first step.

According to one embodiment, the object to be imaged is deduced from the average autocorrelation of all the illumination patterns by solving the following equation:

$$\hat{O}_{estim}(r) = \operatorname{argmin}_x \left\| C^S_{mesure}(\Delta r_{in}) - \int\int C^I(\Delta r_{in}, \Delta r_{out}) C^X(\Delta r_{out}) d^2 \Delta r_{out} \right\|$$ [Math. 1]

where $\Delta r_{in} = (\Delta x_{in}, \Delta y_{in})$ defines a scanning position on the entrance face of the square-core multimode optical fiber with $x_{in}$ and $y_{in}$ coordinates on the entrance face of the square-core multimode optical fiber, $\Delta r_{out}$ represents the coordinates of the exit face of the square-core multimode optical fiber, $C^I$ is the average autocorrelation of the N illumination patterns, $C^X$ is the autocorrelation of a test object X, $C^S_{mesure}$ is the average autocorrelation of all the illumination patterns, and $\hat{O}_{estim}(r)$ is the obtained estimate of the object to be imaged (O).

According to one embodiment, the object to be imaged is deduced from the average autocorrelation of all the illumination patterns by a neural network trained beforehand on a defined class of objects, the neural network delivering an estimate of the object to be imaged based on the average autocorrelation, through comparison of the average autocorrelation known by the neural network from the objects of the defined class to the average autocorrelation computed for the object to be imaged.

A U-NET-type neural network may for example be used as neural network. The method used is for example described in the scientific publication "*Compensating for visibility artefacts in photoacoustic imaging with a deep learning approach providing prediction uncertainties*", Guillaume Godefroy, Bastien Amal, Emmanuel Bossy, Photoacoustics, 21:100218, 2021.4.

In this method the dataset used to train the neural network consists of a series of known test objects and their average-autocorrelation function (which is also known). The objects of the series must belong to a defined class of objects (e.g. a series of handwritten characters, cell populations, blood vessels), and the network will allow an unknown object to be reconstructed provided that it forms part of the family on which the network was trained. One example of a very widely used class of known objects is given by the MNIST database of handwritten digits (https://en.wikipedia.org/wiki/MNIST_database).

According to one embodiment, the square-core multimode optical fiber is flexible. The invention thus allows imaging with a flexible fiber, the shape of the square-core multimode optical fiber being able to change between two measurements, provided that it does not change during a given measurement, increasing the flexibility of the imaging process and therefore the ease with which it may be used.

According to one embodiment, the square-core multimode optical fiber comprises a cladding covering a core of square cross section, the core having dimensions of between 10 μm*10 μm and 1 mm*1 mm, preferably of between 50 μm*50 μm and 200 μm*200 μm, and more preferably of between 100 μm*100 μm and 150 μm*150 μm. The objective of miniaturization of the invention is thus achieved with fiber diameters 20 to 30 times smaller than the diameter of the bundle of single-mode fibers of the prior art.

Another subject of the invention is an endoscope for imaging an object to be imaged, characterized in that it comprises a lighting device, an optical system, at least one square-core multimode optical fiber, the optical system optically coupling the lighting device to the entrance of the at least one square-core multimode optical fiber, the object to be imaged being configured to be placed at the exit of the at least one square-core multimode optical fiber, a signal-measuring device for measuring the signal generated by the object to be imaged and a computing device for implementing the method such as described above.

Given the diameter of the square-core multimode optical fiber, the endoscope according to the invention is thus minimally invasive and does not require any prior calibrating phase, greatly decreasing imaging time.

According to one embodiment, the optical system comprises a translating device for translating an illumination pattern generated by the lighting device over all or part of the entrance plane of the at least one square-core multimode optical fiber, the translating device being configured to translate the illumination pattern in a plane parallel to the entrance plane of the at least one square-core multimode optical fiber, the translating device being one among a liquid-crystal-based spatial light modulator, a digital-micro-mirror-device (DMD) spatial light modulator, an optical diffuser associated with a translation stage, and an optical diffuser associated with galvanometric mirrors. The optical diffusers may in particular be made of a diffusing glass.

According to one embodiment, the signal-measuring device consists of at least one of:
  the at least one square-core multimode optical fiber, associated with an optical sensor at the entrance of the square-core multimode optical fiber with a view to sensing an optical signal reflected by the object to be imaged, the optical system then comprising a beam splitter for sending the signal generated by the object through the at least one square-core multimode optical fiber to the optical sensor,
  at least one auxiliary optical fiber, associated with an optical sensor located at the entrance end of the square-core multimode optical fiber of the endoscope with a view to sensing an optical signal reflected by the object to be imaged,
  a hydrophone that comprises an optical fiber, with a view to sensing the photoacoustic signal of the object to be imaged, said hydrophone being associated with a photoacoustic detecting device.

The at least one square-core multimode optical fiber will preferably be attached, where appropriate, to the auxiliary optical fiber or to the hydrophone optical fiber for the purpose of decreasing bulk in order to minimize the intrusiveness of the end of the endoscope.

According to one embodiment, when the object to be imaged is fluorescent, the signal-measuring device consists of at least one among:
  the at least one square-core multimode optical fiber, associated with an optical sensor at the entrance of the square-core multimode optical fiber for sensing a fluorescence signal of the object to be imaged, the optical system then comprising a dichroic filter for sending the signal generated by the object through the at least one square-core multimode optical fiber to the optical sensor,
  at least one auxiliary optical fiber, associated with a sensor located at the entrance end of the square-core multimode optical fiber of the endoscope with a view to sensing a fluorescence signal of the object to be imaged, the optical system then comprising a dichroic filter for sending the signal generated by the object through the at least one auxiliary optical fiber to the optical sensor.

According to one embodiment, the computing device is selected from at least one among a computer, a microprocessor, a digital signal processor (DSP), a processor, a microcontroller, a field-programmable gate array (FPGA), and an application-specific integrated circuit (ASIC), and comprises memory. The computing device may form part of the endoscope according to the invention or be remote and connected to the endoscope.

According to one embodiment, the at least one square-core multimode fiber is flexible. It is thus possible to obtain a flexible endoscope.

According to one embodiment, the at least one square-core multimode fiber comprises a cladding covering a core of square cross section, the core having dimensions of between 10 μm*10 μm and 1 mm*1 mm, preferably of between 50 μm*50 μm and 200 μm*200 μm, and more preferably of between 100 μm*100 μm and 150 μm*150 μm.

Another subject of the invention is a computer program product, characterized in that it comprises instructions that, when they are loaded and executed on a computing device of an endoscope such as described above, allow the method such as described above to be implemented.

In order to better illustrate the subject matter of the present invention, particular embodiments thereof will now be described, with reference to the appended drawings.

In these drawings.

Figure 1:
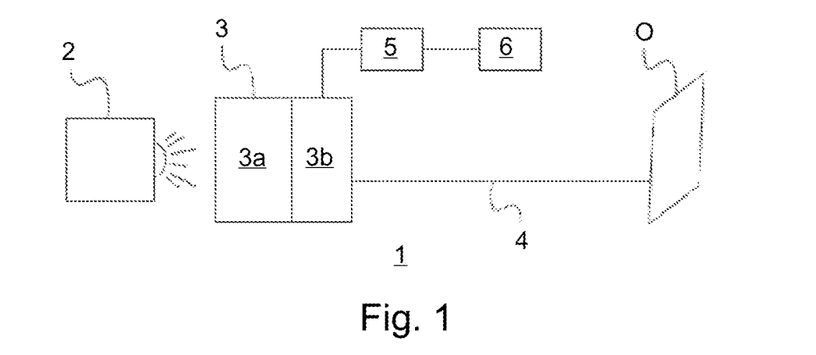
FIG. 1 shows an endoscope according to a first embodiment of the invention.

With reference to FIG. 1, it may be seen that an endoscope 1 according to a first embodiment of the invention has been shown.

The endoscope 1 comprises a lighting device 2 generating coherent light and preferably monochromatic light, preferably a laser.

Facing the lighting device 2 in the endoscope 1 is placed an optical system 3 that sends the light generated by the lighting device 2 into a square-core multimode optical fiber 4. The exit of the square-core multimode optical fiber 4 opens directly (no optical element) onto an object to be imaged O. A measuring device 5 is connected to the optical system 3 and to a computing device 6.

The optical system 3 comprises a translating device 3a for translating an illumination pattern generated by the lighting device 2 over all or part of the entrance plane of the at least one square-core multimode optical fiber 4. The translating device 3a may be one among a liquid-crystal-based spatial light modulator, a digital-micromirror-device spatial light modulator, an optical diffuser associated with a translation stage, and an optical diffuser associated with galvanometric mirrors.

The optical system 3 also comprises a beam splitter 3b, allowing the optical beam generated by illumination of the object to be imaged O to be redirected through the square-core multimode optical fiber 4 to the measuring device 5.

In this first embodiment, the lighting device 2 generates an illumination pattern that is directed to the optical system 3, inside of which the translating device 3a translates the illumination pattern over the entrance face of the square-core multimode optical fiber 4, which conveys this illumination pattern to the object to be imaged O, which delivers, through the square-core multimode optical fiber 4, a reflected optical signal that is transmitted via the beam splitter 3b to the measuring device 5 which, associated with the computing device 6, allows the object to be imaged O to be reconstructed with the method described in more detail below.

With this first embodiment, it is possible to capture, using the square-core multimode optical fiber 4, either the reflected optical signal or fluorescence generated by the object to be imaged O, the measuring device in both cases being an optical sensor.

Figure 2:
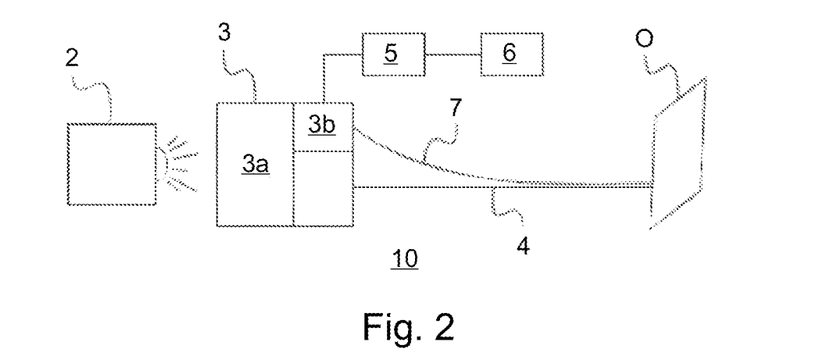
FIG. 2 shows an endoscope according to a second embodiment of the invention.

With reference to FIG. 2, it may be seen that an endoscope 1 according to a second embodiment of the invention has been shown.

As for the first embodiment, the endoscope 10 comprises a lighting device 2 generating coherent light and preferably monochromatic light, preferably a laser.

Facing the lighting device 2 in the endoscope 10 is placed an optical system 3 that sends the light generated by the lighting device 2 into a square-core multimode optical fiber 4. The exit of the square-core multimode optical fiber 4 opens directly (no optical element) onto an object to be imaged O. A measuring device 5 is connected to the optical system 3 and to a computing device 6.

An auxiliary optical fiber 7 captures the reflected optical signal generated by the object to be imaged O, and delivers it to the beam splitter 3b of the optical system 3.

In this second embodiment, the lighting device 2 generates an illumination pattern that is directed to the optical system 3, inside of which the translating device 3a translates the illumination pattern over the entrance face of the square-core multimode optical fiber 4, which conveys this illumination pattern to the object to be imaged O, which delivers, through the auxiliary optical fiber 7, a reflected optical signal that is transmitted via the beam splitter 3b to the measuring device 5 which, associated with the computing device 6, allows the object to be imaged O to be reconstructed with the method described in more detail below.

With this second embodiment, it is possible to capture, using the auxiliary optical fiber 7, either the reflected light, in which case the measuring device 5 is an optical sensor of reflected light (of the same wavelength), or fluorescence generated by the object to be imaged O, in which case the measuring device is an optical sensor of fluorescence.

Figure 3:
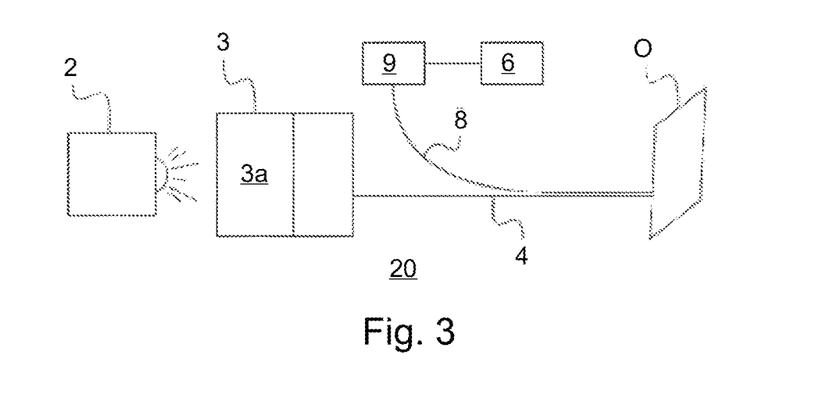
FIG. 3 shows an endoscope according to a third embodiment of the invention.

With reference to FIG. 3, it may be seen that an endoscope 1 according to a third embodiment of the invention has been shown.

As for the first embodiment, the endoscope 20 comprises a lighting device 2 generating coherent light and preferably monochromatic light, preferably a laser.

Facing the lighting device 2 in the endoscope 20 is placed an optical system 3 that sends the light generated by the lighting device 2 into a square-core multimode optical fiber 4. The exit of the square-core multimode optical fiber 4 opens directly (no optical element) onto an object to be imaged O. A hydrophone 9 comprising an optical fiber 8 is connected to the optical system 3 and to a computing device 6.

The optical fiber 8 of the hydrophone 9 captures a photoacoustic signal generated by the object to be imaged O, and delivers it to the hydrophone 9, which hydrophone 9 sends a signal to the computing device 6.

In this third embodiment, the lighting device 2 generates an illumination pattern that is directed to the optical system 3, inside of which the translating device 3a translates the illumination pattern over the entrance face of the square-core multimode optical fiber 4, which conveys this illumination pattern to the object to be imaged O, which delivers, through the optical fiber 8, a photoacoustic signal, which is transmitted via the hydrophone 9 to the computing device 6 with a view to reconstructing the object to be imaged O with the method described in more detail below.

With this third embodiment, a photoacoustic signal generated by the object to be imaged O may be captured.

In all three embodiments, the computing device 6 is at least one among a computer, a microprocessor, a digital signal processor (DSP), a processor, a microcontroller, a field-programmable gate array (FPGA), and an application-specific integrated circuit (ASIC), and comprises memory.

Figure 4:
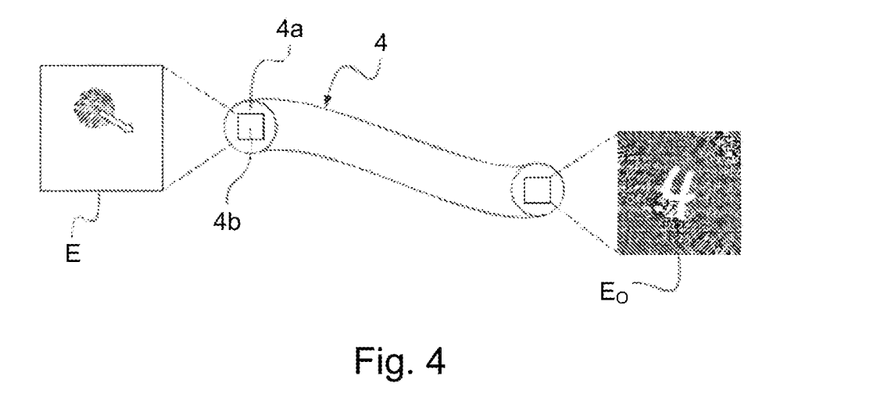
FIG. 4 is a schematic representation of a square-core multimode fiber according to the invention.

FIG. 4 schematically illustrates the square-core multimode optical fiber 4, which comprises a cylindrical cladding 4a covering a core 4b of square cross section.

Typically, the square-core multimode optical fiber 4 is flexible, the core having dimensions of between 10 µm*10 µm and 1 mm*1 mm, preferably of between 50 µm*50 µm and 200 µm*200 µm, and more preferably of between 100 µm*100 µm and 150 µm*150 µm.

It may be seen that a speckle pattern E is delivered to the entrance of the square-core multimode optical fiber 4, this speckle pattern being translated over all or part of the entrance of the square-core multimode optical fiber 4, thereby generating, at the exit of the square-core multimode optical fiber 4, illumination $E_O$ on the object to be imaged.

The method according to the invention will now be described in more detail with reference to FIG. 5.

Figure 5:
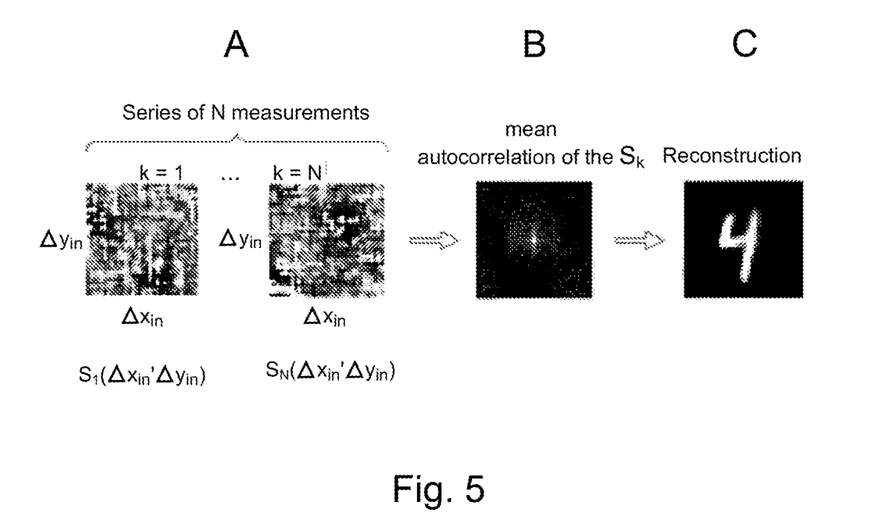
FIG. 5 schematically shows the steps of the imaging method according to the invention.

In a first step, indicated by the letter A in FIG. 5, for N measurements, N being a natural number higher than or equal to 1, an illumination pattern is scanned over the entrance face of the square-core multimode optical fiber.

A given electromagnetic field corresponding to an illumination pattern is considered, this field being designated $E_k^{in}(x_{in}, y_{in})$, k=1 ... N, and corresponding to an intensity pattern:

$$I_k^{in}(x_{in}, y_{in}) = |E_k^{in}(x_{in}, y_{in})|^2 \qquad \text{[Math. 2]}$$

$x_{in}$ and $y_{in}$ being coordinates on the entrance face of the square-core multimode optical fiber. The measuring procedure consists in carrying out a two-dimensional scan of this field in the plane of the square-core multimode optical fiber, i.e. in illuminating the entrance face of the square-core multimode optical fiber with patterns taking the form:

$$E_k^{in}(x_{in}, y_{in}, \Delta x_{in}, \Delta y_{in}) = E_k^{in}(x_{in} - \Delta x_{in}, y_{in} - \Delta y_{in}) \qquad \text{[Math. 3]}$$

The set of all values of $\Delta x_{in}$ and $\Delta y_{in}$ defines a scan, for a given pattern $E_k^{in}(x_{in}, y_{in})$. In practice, the extent of the scan is rectangular, with $$\Delta x_{in} \in [\Delta x_{in}^{min}, \Delta x_{in}^{max}] \qquad \text{[Math. 4]}$$

and $$\Delta y_{in} \in [\Delta y_{in}^{min}, \Delta y_{in}^{max}] \qquad \text{[Math. 5]}$$

and may correspond to:
scanning the pattern over the entire entrance surface of the square-core multimode optical fiber;
scanning the pattern only over a limited portion of the entrance surface of the square-core multimode optical fiber.

This procedure is repeated for a number N of different patterns, the patterns being different in the sense that the same patterns are never found in two scanning procedures (either because the basic patterns are different, or because the same pattern is scanned over different areas).

In practice, a plurality of optical devices allows patterns to be generated and scanned:
a spatial light modulator (SLM) may be used, an SLM making it possible both to choose a pattern defined by the pixels of the SLM and then this pattern to be translated in the entrance plane of the square-core multimode optical fiber. It is possible to use either a liquid-crystal-based SLM (LCOS SLM), making it possible to modulate the phase of a light wave in each pixel, or a digital-micromirror-device (DMD) SLM, making it possible to modulate the amplitude in each pixel;

an optical diffuser may be used, to generate a pattern of random appearance (i.e. a speckle pattern). A modification of the position of the diffuser with respect to the illumination beam then makes it possible to generate a plurality of patterns k=[1, ... , N]. This pattern may then be scanned in the plane of the square-core multimode optical fiber by translating the assembly made up of the illumination beam and the diffuser, either using one or more translation stages or using galvanometric mirrors.

In a second step, the signal generated by the object to be imaged at the exit of the square-core multimode optical fiber is measured.

The optical intensity at the exit of the fiber corresponding to the field $E_k^{in}(x_{in}, y_{in}, \Delta x_{in}, \Delta y_{in})$ at the entrance, for a scanning position defined by $\Delta r_{in}=(\Delta x_{in}, \Delta y_{in})$, is denoted $I_k^{out}(x_{out}, y_{out}, \Delta x_{in}, \Delta y_{in})$.

The signal measured for each position $\Delta r_{in}=(\Delta x_{in}, \Delta y_{in})$ is denoted $S_k(\Delta x_{in}, \Delta y_{in})$. It is assumed for the subsequent reconstruction that this signal measured in the presence of an object $O(x_{out}, y_{out})$ is of the form:

$$S_k(\Delta x_{in}, \Delta y_{in}) = \qquad \text{[Math. 6]}$$
$$\int\int I_k^{out}(x_{out}, y_{out}, \Delta x_{in}, \Delta y_{in}) O(x_{out}, y_{out}) dx_{out} dy_{out}$$

This assumption corresponds to many situations, including the following situations:
the signal corresponds to the light reflected by a reflective sample;
the signal corresponds to the intensity of fluorescence emitted by a fluorescent object; or
the signal corresponds to a photoacoustic signal.

At the end of the measurements, a set of N tables of values that are denoted $S_k(\Delta x_{in}, \Delta y_{in})$, k=1 ... N is thus obtained, these values being measured in each position of the scan and containing information on the object to be imaged to be reconstructed.

In a third and final step, the object to be imaged is reconstructed from the preceding measurements.

In all of the following, the spatial autocorrelation operator of a function f is defined by:

$$[f \otimes f](r) = \int\int f(r')f(r'+r)d^2\Delta r' \qquad \text{[Math. 7]}$$

For each measurement $S_k(\Delta x_{in}, \Delta y_{in})$, the spatial autocorrelation is computed:

$$C_k^S = S_k \otimes S_k \qquad \text{[Math. 8]}$$

in order to finally compute the average autocorrelation of all the illumination patterns (indicated by the letter B in FIG. 5):

$$C_{mesure}^S(\Delta x_{in}, \Delta y_{in}) = <C_k^S(\Delta x_{in}, \Delta y_{in})>_{k=1 \ldots N} \qquad \text{[Math. 9]}$$

At this stage, the procedure is identical to that described in the scientific publication "*Non-invasive imaging through opaque scattering layers*", Jacopo Bertolotti, Elbert G Van Putten, Christian Blum, Ad Lagendijk, Willem L Vos, and Allard P Mosk, Nature, 491 (7423):232-234, 2012. It may be shown that the average autocorrelation of the signal may be written as a function of the average autocorrelation of the exit intensity patterns:

$$C^S_{theory}(\Delta r_{in}) = \int\int C^I(\Delta r_{in}, \Delta r_{out}) C^O(\Delta r_{out}) d^2\Delta r_{out} \quad [\text{Math. 10}]$$

where $C^I = \langle I_k^{out} \otimes I_k^{out} \rangle$ is the average autocorrelation of the N illumination patterns and $C^O(r) = \langle O(r) \otimes O(r) \rangle$ is the autocorrelation of the object.

It is the equation Math. 10 that forms the basis of the ability to reconstruct the object O(r) from the measurements (step C in FIG. 5), the general method proposed here in fact corresponding to finding an object O(r) that satisfies the equation Math. 10. To do this, non-exhaustively, at least two possible methods will be described here.

The first method is the method solving the so-called inverse problem.

Specifically, for a square-core multimode optical fiber it may be shown that the average autocorrelation of illumination patterns may be written explicitly in the form:

$$C^I(\Delta r_{out}; \Delta r_{in}) = \frac{1}{16} \left| \sum_{\in = \{+,\mp,-,\pm\}} \mu\left(2\pi \frac{NA}{\lambda} \|\Delta r_{out}, \Delta r_{in}^\in\|\right) \right|^2 \quad [\text{Math. 11}]$$

with $$\mu(\theta) = \frac{2J_1(\theta)}{\theta} \quad [\text{Math. 12}]$$

$J_1$ being the first order Bessel function and $$\Delta r_{in}^+ = +\Delta r_{in} \quad [\text{Math. 13}]$$

$$\Delta r_{in}^\mp = (-\Delta x_{in}, \Delta y_{in}) \quad [\text{Math. 14}]$$

$$\Delta r_{in}^- = -\Delta r_{in} \quad [\text{Math. 15}]$$

$$\Delta r_{in}^\pm = (\Delta x_{in}, -\Delta y_{in}) \quad [\text{Math. 16}]$$

the four vectors $\Delta r_{in}^\in$ in the four directions of the memory effect observed in the case of the squared fiber. The object may thus be estimated by solving the following inverse problem.

$$\hat{O}_{estim}(r) = \quad [\text{Math. 17}]$$
$$\operatorname{argmin}_X \left\| C^S_{mesure}(\Delta r_{in}) - \int\int C^I(\Delta r_{in}, \Delta r_{out}) C^X(\Delta r_{out}) d^2\Delta r_{out} \right\|$$

where $C^X = \langle X \otimes X \rangle$ is the autocorrelation of a test object X. Equation Math. 17 means that the estimate of the object $\hat{O}_{estim}$ obtained by solving the problem is the object X that minimizes the deviation between the measurement result $C_{mesure}^S(\Delta r_{in})$ and the model $$C^S_{theory}(\Delta r_{in}) = \int\int C^I(\Delta r_{in}, \Delta r_{out}) C^X(\Delta r_{out}) d^2\Delta r_{out} \quad [\text{Math. 18}]$$

There are many conventional methods for solving this type of inverse problem, for example the optimization method Adam, see Kingma, Diederik P., and Jimmy Ba. "Adam: A method for stochastic optimization" arXiv preprint arXiv:1412.6980 (2014).

The second method is the neural-network method.

If the object to be reconstructed belongs to a well-defined class of objects, then a trained neural network may be used to pass from an "image" defined by $C^S(\Delta r_{in})$ to the object O(r). Contrary to the previous method, this method does not require an expression for $C^I(\Delta r_{in}, \Delta r_{out})$ to be known, but is limited to a well-defined class of objects on which a neural network can be trained.

The method has been implemented with a U-NET: in the training phase, the network was fed with pairs $\{C^S(\Delta r_{in}); O(r)\}_{known}$ for which both $C^S(\Delta r_{in})$ and O(r) are known. The neural network is then capable of providing an estimate of an object from $C_{mesure}^S(\Delta r_{in})$.

The structure of the U-NET used and the method is for example described in the scientific publication "*Compensating for visibility artefacts in photoacoustic imaging with a deep learning approach providing prediction uncertainties*", Guillaume Godefroy, Bastien Arnal, Emmanuel Bossy, Photoacoustics, 21:100218, 2021.4.

The invention claimed is:

1. A method for imaging an object to be imaged, the method comprising:
   generating, using a lighting device, a series of illumination pattern(s);
   for each respective illumination pattern of the series of the illumination pattern(s), carrying out a stimulating phase in which translations of the respective illumination pattern are carried out over an entrance of a square-core multimode optical fiber by at least one translating device of an optical system placed between the lighting device and the entrance of the square-core multimode optical fiber, the translations being carried out in a plane parallel to the entrance plane of the square-core multimode optical fiber;
   for each stimulating phase, carrying out an acquiring phase in which the signal generated by the respective illumination pattern on the object to be imaged placed at the exit of the square-core multimode optical fiber is measured by a signal-measuring device; and
   reconstructing, using a computing device, by the signal measured in each acquiring phase, the object to be imaged,
   wherein the reconstruction of the object to be imaged by the computing device comprises, in each acquiring phase, computing the spatial autocorrelation of the measured signal then computing an average autocorrelation of all the illumination pattern(s) in the series of the illumination pattern(s), followed by deducing the object to be imaged from the average autocorrelation of all the illumination pattern(s) in the series of the illumination pattern(s) obtained in the computing.

2. The imaging method as claimed in claim 1, wherein the at least one translating device is selected from the group consisting of a liquid-crystal-based spatial light modulator, a digital-micromirror-device spatial light modulator, an optical diffuser associated with a translation stage, and an optical diffuser associated with galvanometric mirrors.

3. The imaging method as claimed in claim 1, wherein the signal-measuring device is an optical sensor adapted for measuring the optical signal reflected by the object to be imaged, associated with a detection optical fiber placed between the object to be imaged and the optical sensor, the detection optical fiber being selected from the group consisting of the square-core multimode optical fiber and an auxiliary optical fiber.

4. The imaging method as claimed in claim 1, wherein the signal-measuring device is a hydrophone that comprises an optical fiber and that measures the photoacoustic signal of the object to be imaged.

5. The imaging method as claimed in claim 1, wherein the object to be imaged is fluorescent and the signal-measuring device is an optical sensor for measuring the fluorescence signal emitted by the object to be imaged, associated with a detection optical fiber placed between the object to be imaged and the optical sensor, the detection optical fiber being selected from the group consisting of the square-core multimode optical fiber and an auxiliary optical fiber.

6. The imaging method as claimed in claim 1, wherein, in each stimulating phase, the translations are carried out in all of the entrance plane of the square-core multimode optical fiber.

7. The imaging method as claimed in claim 1, wherein the lighting device is a coherent light source.

8. The imaging method as claimed in claim 1, wherein the computing device is selected from the group consisting of a computer, a microprocessor, a digital signal processor, a processor, a microcontroller, a field-programmable gate array, and an application-specific integrated circuit, and comprises memory.

9. The imaging method as claimed in claim 1, wherein the object to be imaged is deduced from the average autocorrelation of all the illumination pattern(s) by solving the following equation:

$$\hat{O}_{estim}(r) = \mathrm{argmin}_x \left\| C^S_{mesure}(\Delta r_{in}) - \int\int C^I(\Delta r_{in}, \Delta r_{out}) C^X(\Delta r_{out}) d^2 \Delta r_{out} \right\|$$

where $\Delta r_{in} = (\Delta x_{in}, \Delta y_{in})$ defines a scanning position on the entrance face of the square-core multimode optical fiber with $x_{in}$ and $y_{in}$ coordinates on the entrance face of the square-core multimode optical fiber, $\Delta r_{out}$ represents the coordinates of the exit face of the square-core multimode optical fiber, $C^I$ is the average autocorrelation of the N illumination pattern(s), $C^X$ is the autocorrelation of a test object X, $C^S_{mesure}$ is the average autocorrelation of all the illumination pattern(s), and $\hat{O}_{estim}(r)$ is the obtained estimate of the object to be imaged.

10. The imaging method as claimed in claim 1, wherein the object to be imaged is deduced from the average autocorrelation of all the illumination pattern(s) by a neural network trained beforehand on a defined class of objects, the neural network delivering an estimate of the object to be imaged based on the average autocorrelation, through comparison of the average autocorrelation known by the neural network from the objects of the defined class to the average autocorrelation computed for the object to be imaged.

11. The imaging method as claimed in claim 1, wherein the square-core multimode optical fiber is flexible.

12. The imaging method as claimed in claim 1, wherein the square-core multimode optical fiber comprises a cladding covering a core of square cross section, the core having dimensions in a range of from 10 µm×10 µm to 1 mm×1 mm.

13. An endoscope for imaging an object to be imaged, wherein the endoscope comprises:
a lighting device,
an optical system,
at least one square-core multimode optical fiber, the optical system optically coupling the lighting device to the entrance of the at least one square-core multimode optical fiber,
a translating device for translating an illumination pattern generated by the lighting device over all or part of the entrance plane of the at least one square-core multimode optical fiber (4),
the translating device being configured to translate the illumination pattern in a plane parallel to the entrance plane of the at least one square-core multimode optical fiber,
the object to be imaged being configured to be placed at the exit of the at least one square-core multimode optical fiber,
a signal-measuring device configured for measuring the signal generated by the object to be imaged, and
a computing device configured for implementing a method comprising:
generating, using the lighting device, a series of illumination pattern(s), each illumination pattern in the series being different from all other illumination pattern(s) in the series, if any;
for each respective illumination pattern of the series of illumination pattern(s), carrying out a stimulating phase in which translations of the respective illumination pattern are carried out over an entrance of a square-core multimode optical fiber by the at least one translating device of the optical system placed between the lighting device and the entrance of the square-core multimode optical fiber, the translations being carried out in the plane parallel to the entrance plane of the square-core multimode optical fiber;
for each stimulating phase, carrying out an acquiring phase in which the signal generated by the respective illumination pattern on the object to be imaged placed at the exit of the square-core multimode optical fiber is measured by the signal-measuring device; and
reconstructing, using the computing device, by the signal measured in each acquiring phase, the object to be imaged,
wherein the reconstruction of the object to be imaged by the computing device comprises, in each acquiring phase, computing the spatial autocorrelation of the measured signal then computing an average autocorrelation of all the illumination pattern(s) in the series of the illumination pattern(s), followed by deducing the object to be imaged from the average autocorrelation of all the illumination pattern(s) in the series of the illumination pattern(s) obtained in the computing.

14. The endoscope as claimed in claim 13, wherein the translating device is selected from the group consisting of a liquid-crystal-based spatial light modulator, a digital-micromirror-device spatial light modulator, an optical diffuser associated with a translation stage, and an optical diffuser associated with galvanometric mirrors.

15. The endoscope as claimed in claim 13, wherein the signal-measuring device comprises at least one of the following:
the at least one square-core multimode optical fiber, associated with an optical sensor at the entrance of the square-core multimode optical fiber with a view to sensing an optical signal reflected by the object to be imaged,
at least one auxiliary optical fiber, associated with an optical sensor located at the entrance end of the square-core multimode optical fiber of the endoscope with a view to sensing an optical signal reflected by the object to be imaged, a hydrophone that comprises an optical fiber, with a view to sensing the photoacoustic signal of the object to be imaged.

16. The endoscope as claimed in claim 13, wherein the object to be imaged is fluorescent and the signal-measuring device (comprises at least one of the following:

the at least one square-core multimode optical fiber, associated with an optical sensor at the entrance of the square-core multimode optical fiber for sensing a fluorescence signal of the object to be imaged, at least one auxiliary optical fiber, associated with a sensor located at the entrance end of the square-core multimode optical fiber of the endoscope with a view to sensing a fluorescence signal of the object to be imaged.

17. The endoscope as claimed in claim 13, wherein the computing device is selected from at least one in the group consisting of a computer, a microprocessor, a digital signal processor, a processor, a microcontroller, a field-programmable gate array, an application-specific integrated circuit, and comprises memory.

18. The endoscope as claimed in claim 13, wherein the at least one square-core multimode fiber is flexible.

19. The endoscope as claimed in claim 13, wherein the at least one square-core multimode fiber comprises a cladding covering a core having a square cross section, the core having dimensions in a range of from 10 µm×10 µm to 1 mm×1 mm.

20. A computer program product comprising non-transitory instructions that, when they are loaded and executed on a computing device of an endoscope, cause implementation of a method comprising:

generating, using a lighting device, a series of illumination pattern(s), each illumination pattern in the series being different from all other illumination pattern(s) in the series, if any;

for each respective illumination pattern of the series of the illumination pattern(s), carrying out a stimulating phase in which translations of the respective illumination pattern are carried out over an entrance of a square-core multimode optical fiber by at least one translating device of an optical system placed between the lighting device and an entrance of a square-core multimode optical fiber, the translations being carried out in a plane parallel to the entrance plane of the square-core multimode optical fiber;

for each stimulating phase, carrying out an acquiring phase in which the signal generated by the respective illumination pattern on the object to be imaged placed at the exit of the square-core multimode optical fiber is measured by a signal-measuring device; and reconstructing, using the computing device, by the signal measured in each acquiring phase, the object to be imaged, wherein the reconstruction of the object to be imaged by the computing device comprises, in each acquiring phase, computing the spatial autocorrelation of the measured signal then computing an average autocorrelation of all the illumination pattern(s) in the series of the illumination pattern(s), followed by deducing the object to be imaged from the average autocorrelation of all the illumination pattern(s) in the series of the illumination pattern(s) obtained in the computing.

21. The imaging method as claimed in claim 1, wherein, in each stimulating phase, the translations are carried out in part of the entrance plane of the square-core multimode optical fiber.

* * * * *